(12) United States Patent
Jibert

(10) Patent No.: US 11,801,464 B2
(45) Date of Patent: Oct. 31, 2023

(54) ROTARY DISC FILTER HAVING A BACKWASH SYSTEM THAT INCLUDES A COMPACT NOZZLE SUPPORT STRUCTURE

(71) Applicant: Veolia Water Solutions & Technologies Support, Saint-Maurice (FR)

(72) Inventor: Johan Gustav Alexander Jibert, Oxie (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 72 days.

(21) Appl. No.: 17/673,036

(22) Filed: Feb. 16, 2022

(65) Prior Publication Data
US 2022/0168673 A1 Jun. 2, 2022

Related U.S. Application Data

(62) Division of application No. 15/952,474, filed on Apr. 13, 2018, now Pat. No. 11,291,935.

(51) Int. Cl.
*B01D 33/50* (2006.01)
*B01D 33/15* (2006.01)

(52) U.S. Cl.
CPC ............. *B01D 33/50* (2013.01); *B01D 33/15* (2013.01); *B01D 2201/084* (2013.01)

(58) Field of Classification Search
None
See application file for complete search history.

(56) References Cited

U.S. PATENT DOCUMENTS

| | | | |
|---|---|---|---|
| 1,177,884 A | 4/1916 | Molesta et al. |
| 2,406,065 A | 8/1946 | Dickinson et al. |
| 2,655,265 A | 10/1953 | Little |
| 3,471,176 A | 10/1969 | Gilchrist |
| 3,735,928 A | 5/1973 | Watts et al. |
| 3,891,247 A | 6/1975 | Smith |
| 4,349,073 A | 9/1982 | Zublin |
| 4,527,745 A | 7/1985 | Butterfield et al. |

(Continued)

FOREIGN PATENT DOCUMENTS

| | | |
|---|---|---|
| CN | 2338575 Y | 9/1999 |
| CN | 101694258 A | 4/2010 |

(Continued)

OTHER PUBLICATIONS

Hydrotech Service Pack; twelve pages; 2012. (Year: 2012).

(Continued)

*Primary Examiner* — Robert J Popovics
(74) *Attorney, Agent, or Firm* — COATS & BENNETT, PLLC

(57) ABSTRACT

A rotary disc filter having a backwash system that includes a series of feed pipes that project into and between successive filter discs that are mounted on a rotatable drum. Connected to an outer terminal end portion of the feed pipes is a series of nozzle holders. Each nozzle holder includes a main conduit, a series of branch conduits that project outwardly from the main conduit, and a connector for connecting the nozzle holder to a respective feed pipe. A series of detachable nozzles are secured to the outer terminal ends of the branch conduits.

18 Claims, 12 Drawing Sheets

(56) References Cited

U.S. PATENT DOCUMENTS

| | | | |
|---|---|---|---|
| 4,646,769 A | 3/1987 | O'Brien et al. | |
| 4,717,077 A | 1/1988 | Takata | |
| 4,789,189 A | 12/1988 | Robertson | |
| 4,873,925 A | 10/1989 | Hultberg et al. | |
| 4,915,305 A | 4/1990 | O'Brien et al. | |
| 5,564,448 A | 10/1996 | Lincoln | |
| 5,909,847 A | 6/1999 | Munsche et al. | |
| 5,927,615 A | 7/1999 | Turk | |
| 5,968,372 A | 10/1999 | Martensson et al. | |
| 6,053,427 A | 4/2000 | Wilger et al. | |
| 6,079,638 A | 6/2000 | Chang | |
| 6,294,098 B1 | 9/2001 | Bergmann | |
| 6,497,402 B2 | 12/2002 | Tharp | |
| 7,219,684 B2 | 5/2007 | Dabir et al. | |
| 7,597,805 B2 | 10/2009 | Danielsson et al. | |
| 7,972,508 B2 | 7/2011 | Danielsson et al. | |
| 8,118,175 B2 | 2/2012 | Davis et al. | |
| 8,297,447 B2 | 10/2012 | Sorenson et al. | |
| 8,444,862 B2 | 5/2013 | Ralvert | |
| 9,938,159 B2 | 4/2018 | Larsson | |
| 9,962,635 B2 | 5/2018 | Stewart et al. | |
| 10,420,333 B2 | 9/2019 | Mellin | |
| 11,291,935 B2 * | 4/2022 | Jibert | B05B 1/202 |
| 2010/0258654 A1 | 10/2010 | Peterson et al. | |
| 2012/0325753 A1 | 12/2012 | Baker et al. | |
| 2014/0124461 A1 | 5/2014 | Buisson et al. | |
| 2017/0157540 A1 | 6/2017 | Svensson et al. | |
| 2019/0314743 A1 * | 10/2019 | Jibert | B01D 33/15 |
| 2022/0168673 A1 * | 6/2022 | Jibert | B01D 33/21 |

FOREIGN PATENT DOCUMENTS

| | | |
|---|---|---|
| CN | 201719895 U | 1/2011 |
| CN | 102039066 A | 5/2011 |
| CN | 102345778 A | 2/2012 |
| CN | 202844717 U | 4/2013 |
| CN | 203560627 U | 4/2014 |
| CN | 203777770 U | 8/2014 |
| CN | 104884391 A | 9/2015 |
| CN | 206078396 U | 4/2017 |
| RU | 2578310 C2 | 3/2016 |
| SU | 971422 A1 | 11/1982 |
| WO | 9816293 A1 | 4/1998 |
| WO | 2018060809 A1 | 4/2018 |

OTHER PUBLICATIONS

DiscFilter (Model HSF2208-IF), Kruger, Operation and Maintenance Manual, May 2006, 515 Pages. (Year: 2006).

Hydrotech DiscFilter Model HSF2600, Series PFC, Operation and Maintenance Manual, 2015, 34 Pages; downloaded Nov. 25, 2021. (Year: 2015).

Hydrotech DiscFilter Model HSF31-series, Operation and Maintenance Manual, Revised Jul. 12, 2021, 27 Pages; downloaded Nov. 25, 2021. (Year: 2021).

Hydrotech DiscFilter 2200 series, Revised: Sep. 4, 2001, Four Pages; downloaded Nov. 25, 2021. (Year: 2001).

Hydrotech DiscFilter—A Flexible Filtration System, two pages; downloaded Nov. 25, 2021. (Year: 2021).

Hydrotech Discfilters, Market leading microscreen filters, 16 pages; downloaded Nov. 25, 2021. (Year: 2021).

Hydrotech Discfilters, 17/21/31 series, 4 pages; Downloaded Nov. 25, 2021. (Year: 2021).

In-Eko Disc Filter, 2017, 61 Pages,; downloaded Nov. 25, 2021 (Year: 2017).

Entek, Clean Up Your Wastewater—with Filters, 23 PP; downloaded Nov. 25, 2021. (Year: 2021).

Evoqua Forty-X Disc Filter, 2017, Four PP; downloaded Nov. 25, 2021. (Year: 2017).

Forty-X Technical Specifications, 2007, 2 pp; downloaded Nov. 25, 2021. (Year: 2007).

Forty-X Disc Filter Armor Lite Series, 2018, downloaded Nov. 25, 2021. (Year: 2018).

\* cited by examiner

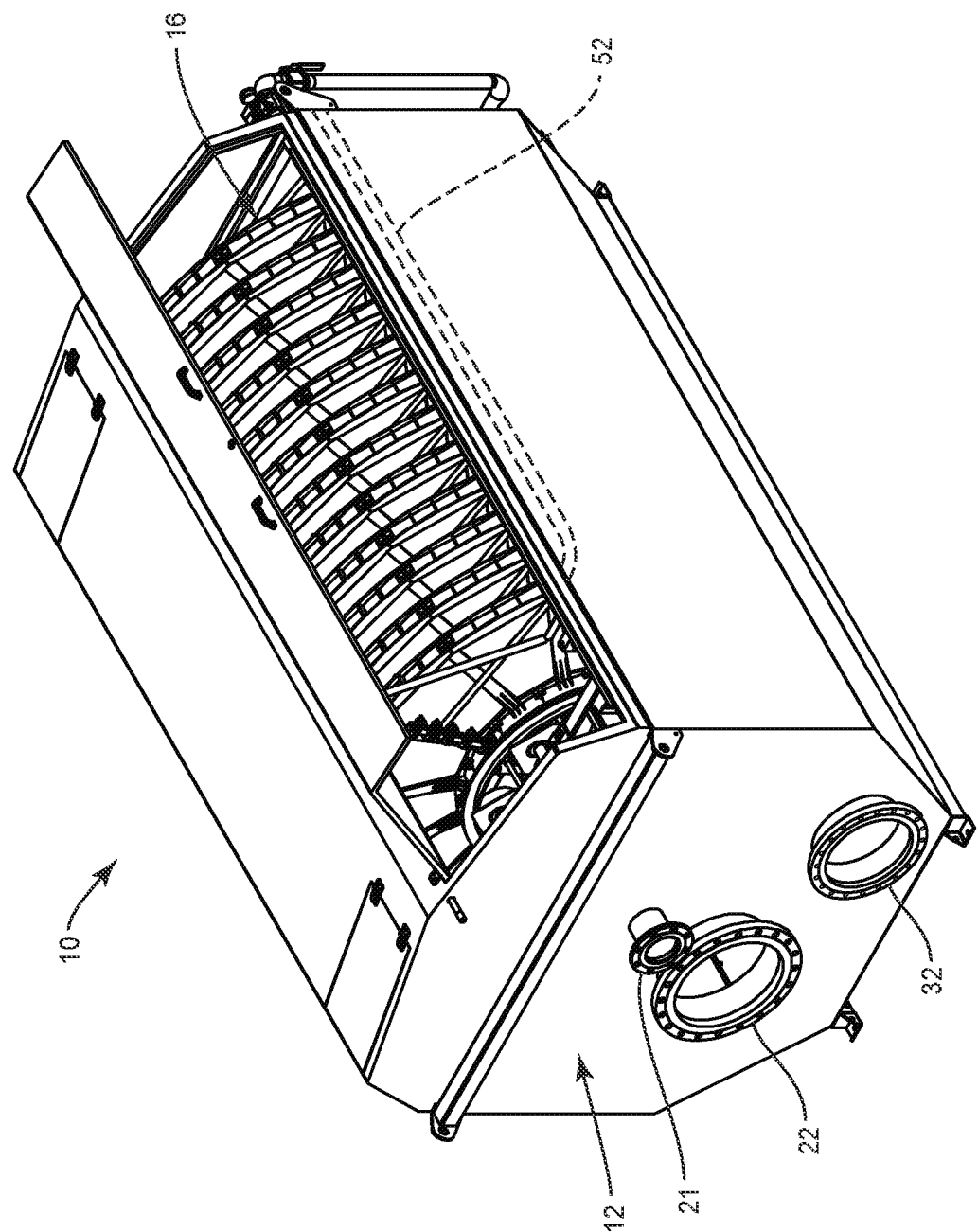

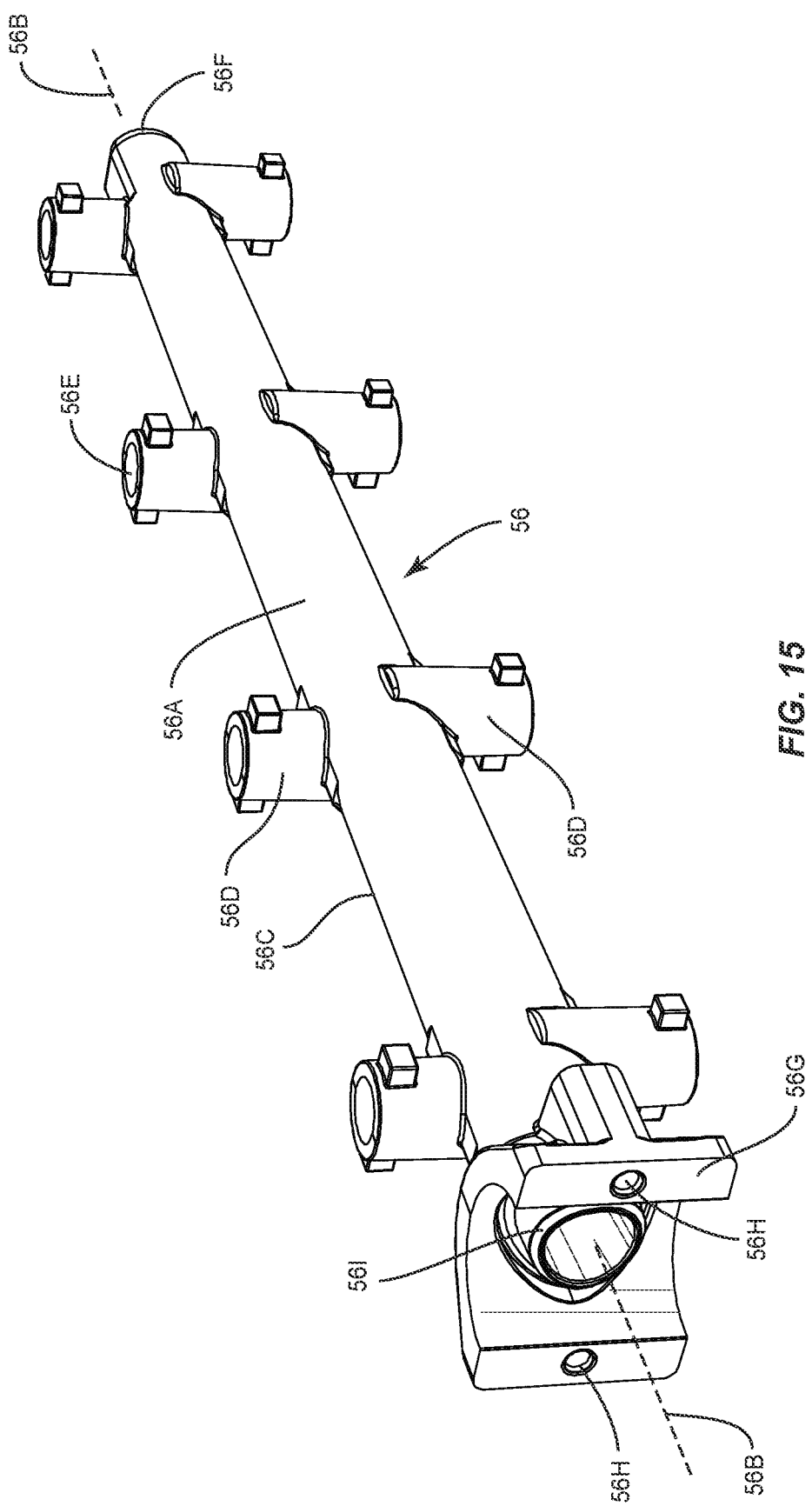

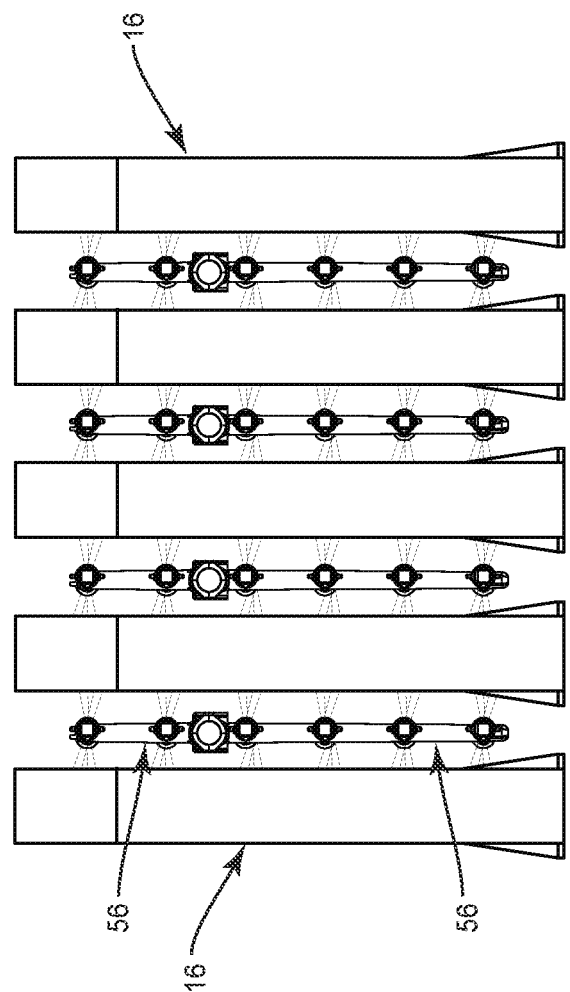

ROTARY DISC FILTER HAVING A BACKWASH SYSTEM THAT INCLUDES A COMPACT NOZZLE SUPPORT STRUCTURE

RELATED APPLICATIONS

This application is a Divisional of prior U.S. application Ser. No. 15/952,474, filed 13 Apr. 2018, the entire contents of which are incorporated herein by reference.

FIELD OF THE INVENTION

The present invention relates to rotary disc filters, and more particularly to rotary disc filters and their backwashing systems.

BACKGROUND OF THE INVENTION

A rotary disc filter employs a backwash system that is periodically actuated to backwash the filter media and dislodges suspended solids disposed on the inner sides of the filter media. Such backwashing systems employ nozzle support assemblies for supporting nozzles adjacent the filter media. There are a number of disadvantages and drawbacks to conventional nozzle support assemblies. First, in a typical rotary disc filter design, there is provided a backwash manifold that extends along one side of the disc filter. Inner steel pipes connected to the manifold extend into areas between the filter discs. Conventional nozzles and associated nozzle support assemblies are operatively connected to the inner end portions of the inner steel pipes. The inner steel pipes and the associated nozzle support assemblies are quite heavy and place a significant torque on the manifold. Secondly, these nozzle support assemblies typically include multiple parts. The steel pipes have to be drilled to provide openings to emit backwash. Typically, these nozzle support assemblies include welded and screw joints that have the potential to leak. In the end, such conventional nozzle support assemblies are costly and require a significant amount of assembly time.

Therefore, there has been and continues to be a need for a nozzle support assembly design that reduces cost, assembly time, number of parts, joints, seals and reduces potential leakage points.

SUMMARY OF THE INVENTION

The present invention relates to a rotary disc filter having a filter backwash system that includes a nozzle holder configured to support multiple nozzles and configured to be operatively connected to a backwash feed pipe, sometimes referred to as an inner pipe.

In one embodiment, the nozzle holder includes an elongated main conduit having an outer wall and a series of branch conduits projecting outwardly from the outer wall and including terminal end portions. Nozzles are detachably secured to the terminal end portions of the branch conduits.

Further in one embodiment, the nozzle holder is constructed of molded plastic and includes a main conduit having an outer wall and a plurality of branch conduits that project outwardly from the outer wall. The branch conduits include terminal end portions that receive detachable nozzles. In this embodiment, the nozzle holder including the main conduit, outer wall, and branch conduits are all formed into a single piece of molded plastic.

Other objects and advantages of the present invention will become apparent and obvious from a study of the following description and the accompanying drawings which are merely illustrative of such invention.

BRIEF DESCRIPTION OF THE DRAWINGS

FIG. 1 is a perspective view of a rotary disc filter with a portion of the housing being open to show a series of filter discs mounted on a rotatable drum.

FIG. 15 is a perspective view of a second embodiment of the nozzle holder.

FIG. 16 is a schematic illustration showing the nozzle holders disposed between successive filter discs and illustrating that the width of the nozzle holders is such that the filter discs can be closely spaced.

DESCRIPTION OF EXEMPLARY EMBODIMENT

Figure 1A:
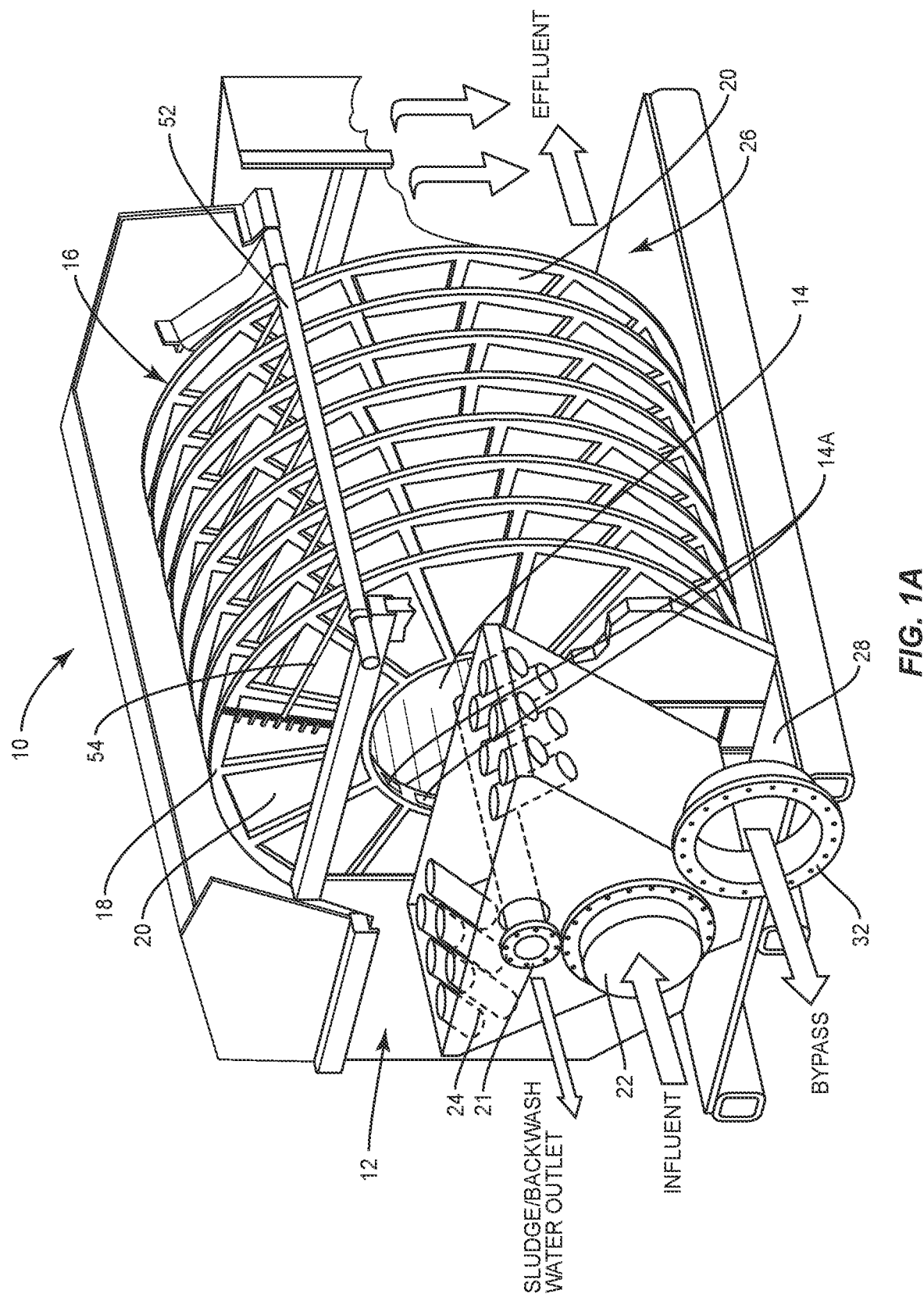
FIG. 1A is a perspective view of a rotary disc filter with a substantial portion of the housing broken away to show the filter discs, the rotating drum that supports the filter discs, as well as illustrating the flow of influent water into the disc filter and the flow of filtered effluent from the disc filter.

With reference to the drawings, there is shown therein a rotary disc filter indicated generally by the numeral 10. As discussed below, disc filter 10 includes a unique nozzle support structure that forms a part of a backwashing system. Before discussing design features of the backwash system, it may be beneficial to briefly discuss the basic design of rotary disc filters.

With particular reference to the drawings (FIGS. 1, 1A and 2), disc filter 10 comprises an outer housing 12. Housing 12 typically includes a top, bottom, sides and ends. It should be noted that some rotary disc filters (a second type) are not provided with a substantial housing structure. These disc filters are often referred to as frame-type disc filters as they are designed to be installed in a pre-formed concrete basin. There is a third type or version of a disc filter which includes a half tank or frame with a bottom and sides and which only reaches to about the center of the drum of the disc filter.

In any event, either type of disc filter is provided with a frame structure for supporting various components that make up the disc filter 10. In this regard, a drum 14 is rotatively mounted in the frame structure of the disc filter. Generally, the drum 14 is closed except that it includes an inlet opening and a series of openings 14A formed in the surface thereof that enable influent water to flow from the drum into a series of disc-shaped filter members (sometimes referred to as filter discs) indicated generally by the numeral 16 and which are mounted on the drum. See FIG. 1A. That is, as will be appreciated from subsequent discussions herein, influent water to be filtered is directed into the drum 14 and from the drum through openings therein into the respective disc-shaped filter members 16.

The number of filter discs 16 secured on the drum 14 can vary. Each filter disc 16 includes a filter frame 18 and filter media 20 secured or disposed on opposite sides thereof. A water holding area is defined inside each filter disc 16 for receiving and holding water to be filtered by the disc filter 10. Head pressure associated with the influent water is effective to cause the water to flow outwardly from the filter disc 16 and through the filter media 20. Water exiting the filter disc 16 is filtered water or filtrate. This results in suspended solids in the water being captured on the interior surfaces of the filter media 20. As described below, a backwashing system is employed from time-to-time to dislodge the suspended solids from the filter media 20 where the suspended solids fall into a trough disposed in the drum after which the suspended solids and some backwash is discharged from the disc filter 10 via a sludge outlet 21. See FIG. 1A.

Filtered water exiting the filter disc 16 is collected in a filtered water holding chamber or area that underlies the filter disc. The filtered water holding chamber or area includes an outlet that enables the filtered water to be discharged from the disc filter 10.

Figure 2:
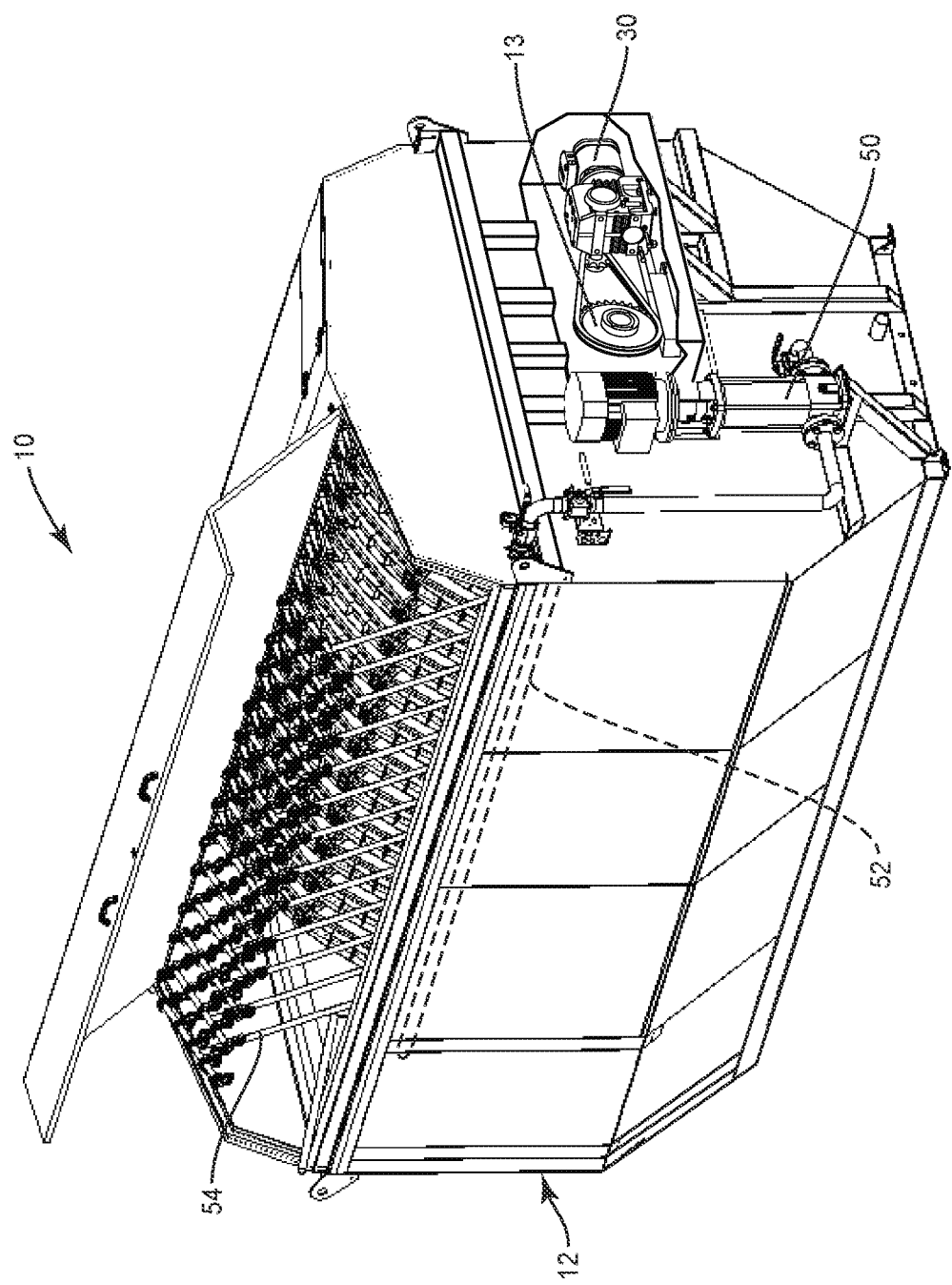
FIG. 2 is a perspective view that particularly illustrates a drive system for rotatively driving the drum of the disc filter, as well as a portion of the backwash system including the backwash pump and side manifold. It should be noted that the backwash nozzles are disposed in an inoperative position. That is, the nozzles are shown rotated outwardly from between the filter disc where they can be inspected, serviced or repaired.
Figure 3:
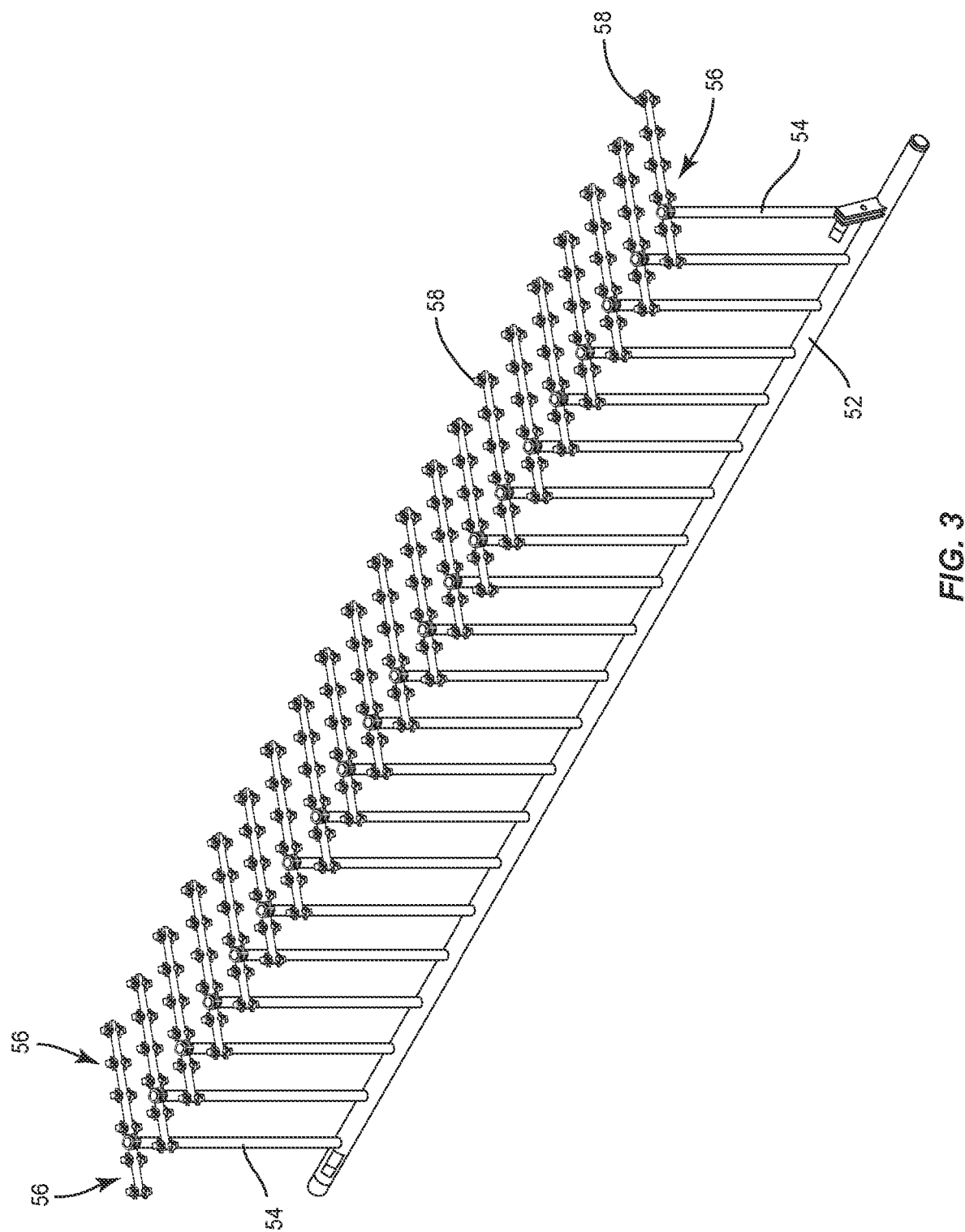
FIG. 3 is a perspective view illustrating a part of the backwash system that includes a manifold pipe, feed pipes and nozzle holders.

As people ordinarily skilled in the art appreciate, during the backwashing operation it is necessary for the drum 14 and the filter discs 16 mounted thereon to rotate. Disc filter 10 is provided with a drive system for rotating the drum 14 and the filter disc 16 mounted thereon. In the case of the embodiment illustrated in FIG. 2, mounted to a panel or a wall structure about the back portion of the disc filter 10 is a drum motor 30 that is operative to drive a sprocket or sheave 13 that is connected to a shaft on which the drum 14 is mounted (FIG. 2). Various means can be operatively interconnected between the drum motor 30 and the sprocket or sheave 13 for rotating the drum 14. In one example, a chain drive is utilized to drive a sprocket secured to a shaft that rotates the drum 14. Various other types of drive systems can be utilized to rotate the drum and the filter disc 16. In some cases, for example, there may be a direct drive on the drum shaft from a geared motor.

FIG. 1A is a perspective view of the disc filter 10 with portions broken away to better illustrate the internal structure of the disc filter and the flow of influent into the disc filter and the flow of filtrate (effluent) from the disc filter. In the case of the embodiment illustrated in FIG. 1A, disc filter 10 is provided with an influent inlet 22. Influent inlet 22 leads to an influent holding tank 24. The influent holding tank 24 is optional. That is, it is not required in some disc filter designs. Influent holding tank 24 is disposed adjacent an inlet opening of the drum 14 such that influent held within the holding tank 24 flows from the holding tank into the drum 14. As seen in FIG. 1A, the influent holding tank 24 is disposed on the upstream side of the disc filter 10. Disposed around and generally below the influent holding tank is a bypass tank 28. An outlet 32 enables influent to flow from the bypass tank 28. Note that the influent holding tank 24 includes overflow openings. These overflow openings permit influent overflow to flow from the holding tank 24 downwardly into the bypass tank 28. This effectively limits the water level height in the influent holding tank 24. There is an alternative design for the separate bypass tank 28. This is referred to as a "mixing bypass". This design simply entails mixing the unfiltered bypass water with the filtered water in the filtrate tank and directing the mixture from the disc filter usually from a rear portion of the disc filter.

Disc filter 10 includes a filtrate or effluent holding tank 26. In the case of the embodiment illustrated in FIG. 1A, the effluent holding tank 26 is disposed about a downstream end portion of the disc filter 10. As shown in FIG. 1, the effluent holding tank 26 extends around at least a lower portion of the filter disc 16. As the influent moves outwardly through the filter media 20, this results in the water being filtered, and it follows that the filtered water constitutes a filtered effluent. It is this effluent that is held in the effluent holding tank 26. An outlet (not shown) can be conveniently located at various places for discharging the filtered effluent from the effluent holding tank 26.

The above discussion provides a general overview of rotary disc filters. For a more complete and unified understanding of rotary disc filters, their structure and operation, one is referred to U.S. Pat. No. 7,972,508 and U.S. patent application Ser. No. 14/775,196, the disclosures of which are expressly incorporated herein by reference.

Rotary disc filter 10 includes a backwashing system for periodically backwashing the filter media 20. The backwashing system comprises a backwash pump 50, a manifold 52 that extends along a side portion of the disc filter 10, and a series of feed pipes 54 connected to the manifold 52 and projecting inwardly therefrom. Feed pipes 54, sometimes referred to as inner pipes, project from the manifold 52 into areas between the filter discs 16. Secured to the feed pipes 54 are a series of nozzle holders indicated generally by the numeral 56. Nozzle holders 56 are designed to receive detachable nozzles 58. As will be appreciated from subsequent portions of the disclosure, backwash pump 50 pumps a backwash from a backwash source, such as the filtered water, into and through the manifold 52. Backwash pump 50 is operative to pump the backwash from the manifold 52 into the respective feed pipes 54 and from the feed pipes into and through the nozzle holders 56 and out the respective nozzles 58. In some embodiments, the disc filter itself may not include a backwash pump 50. In other embodiments, pressurized backwash can be provided from a source other than a backwash pump that forms a part of the rotary disc filter.

Manifold 52 can be rigidly mounted or rotatively mounted along one side of the disc filter 10. In some cases, manifold 52 is operatively connected to a drive (not shown) that can be indirectly driven off the drum motor 30 or the drum 14. In any event, the manifold 52 during a cleaning operation can oscillate back and forth, which results in nozzles 58 sweeping back and forth between the filter media 20 so as to backwash particular areas of the filter media 20. In other cases, the manifold 52, as noted above, is rigidly mounted and does not oscillate back and forth during the backwashing operation.

Each feed pipe 54 is configured to communicatively connect to one or a plurality of nozzle holders 56. See FIG. 5. Note that feed pipe 54 includes an outer wall 54A that includes one or multiple openings 54B formed about the terminal end portion of the feed pipe. See FIG. 4. In the embodiment shown in FIGS. 4 and 5, there is provided two aligned openings 54B in the wall 54A. This enables two nozzle holders 56 to be connected to the feed pipe 54 with each nozzle holder communicatively connected to one of the openings 54B in the wall of the feed pipe. An end cap 54C is secured to the terminal end of the feed pipe 54. Thus, it is appreciated that, in the case of this embodiment, backwash is pumped from the manifold 52 into the feed pipe 54 and into the two nozzle holders 56 secured to the terminal end portion of the feed pipe. It is appreciated that a single nozzle holder 56 can be secured to a feed pipe 54. This is achieved by providing a single opening 54B into the wall 54A and communicatively connecting the single nozzle holder 56 to the single opening formed in the feed pipe.

With reference to FIGS. 10-15, the nozzle holder 56 is shown therein. Nozzle holder 56 includes a main conduit 56A having a longitudinal axis 56B. Main conduit 56A includes an outer wall 56C. Main conduit 56 is open to permit backwash to flow therein. Also forming a part of the nozzle holder 56 is a plurality of branch conduits 56D. As illustrated in the drawings, the branch conduits 56D are both longitudinally spaced and offset with respect to the longitudinal axis 56B. As seen in FIGS. 10-15, the branch conduits 56D project outwardly from the outer wall 56C of the main conduit 56A. Each branch conduit 56D includes a through opening 56E. Through openings 56E permit backwash to flow through the respective branch conduits 56D.

The length of the nozzle holder 56 can vary. There are two exemplary embodiments shown in the drawings. In one exemplary embodiment, there is provided four branch conduits 56D (FIGS. 10-14) and in the other exemplary embodiment (FIG. 15), the nozzle holder includes eight branch conduits. It is appreciated that the size and length of the nozzle holder 56, as well as the number of branch conduits 56D, can vary depending upon specific applications.

Nozzle holder 56 includes an inner end portion and an outer end portion. It is the inner end portion that connects to the feed pipe 54. The outer end of one embodiment of the nozzle holder 56 includes a rounded or spherical tip 56F. See FIG. 5. The reason for this is that it is possible for the nozzle holder 56 to inadvertently fall downwardly into engagement with drum 14 while the drum is rotating. The rounded or spherical tip 56F may minimize or reduce the possibility of damage to the nozzle holder 56, nozzles 58 and/or the associated feed pipe 54.

Figure 6:
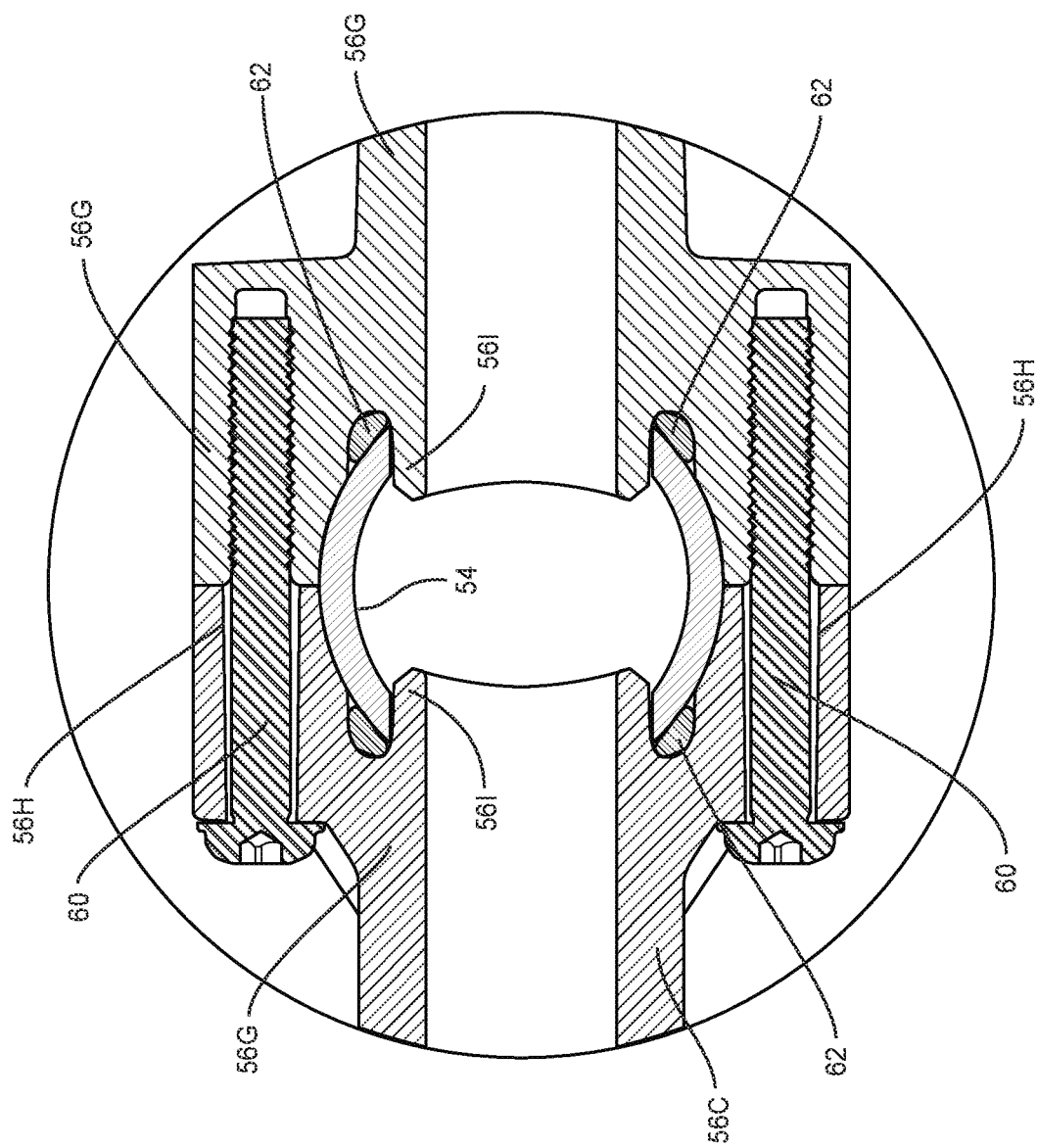
FIG. 6 is a fragmentary horizontal sectional view showing the two nozzle holders connected via a pair of screws to the feed pipe.
Figure 7:
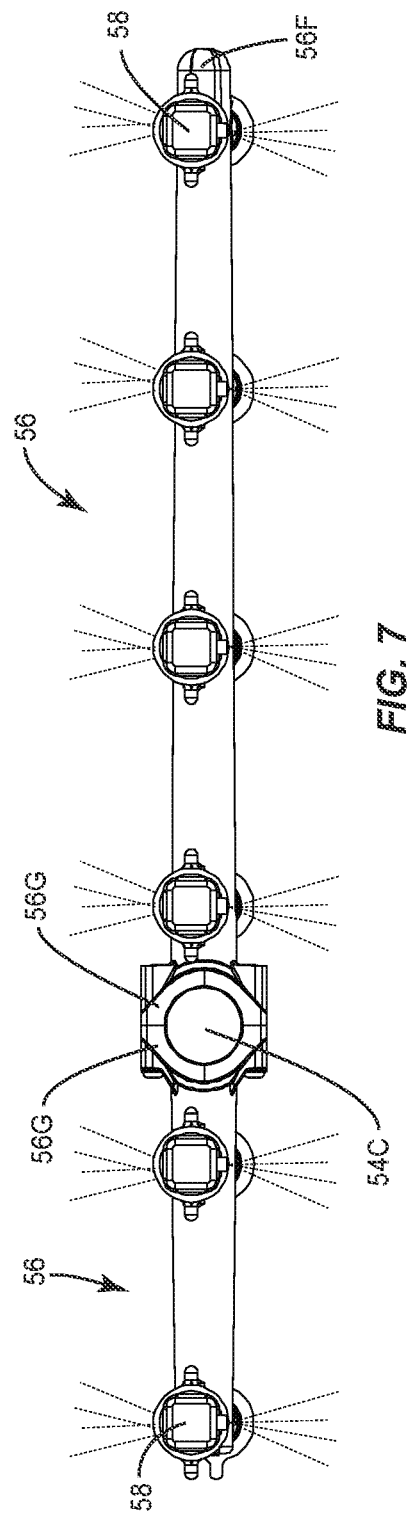
FIG. 7 is a top plan view of the assembly shown in FIG. 5.
Figure 8:
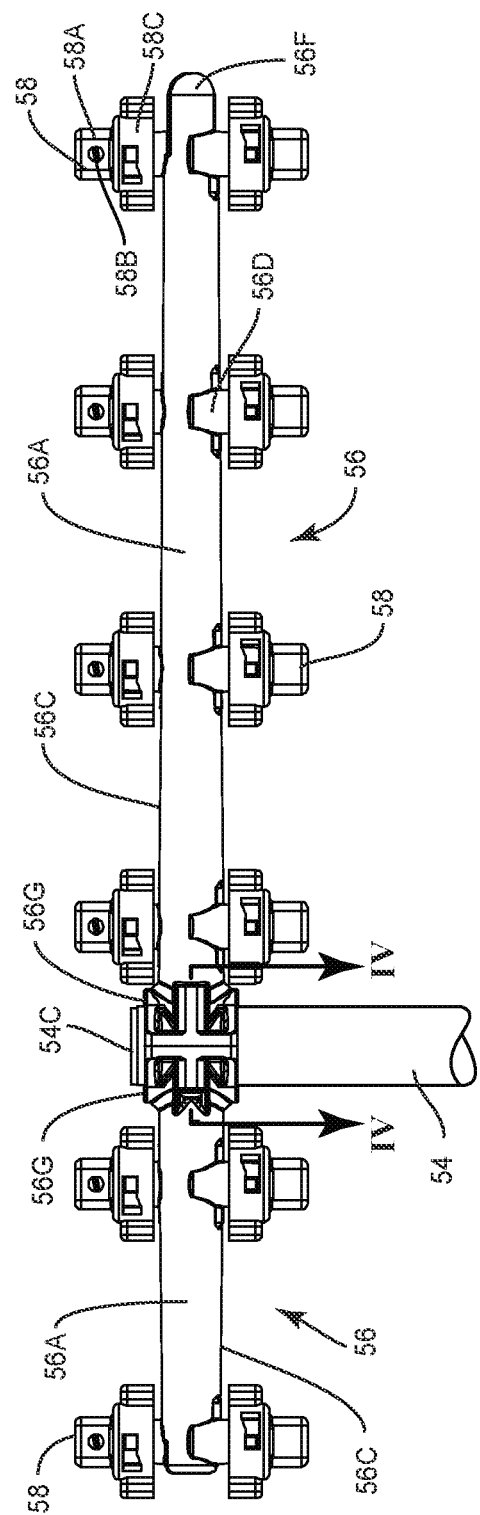
FIG. 8 is a side elevational view of the assembly shown in FIG. 5, but with portions broken away illustrate the connection of the nozzle holders to the backwash feed pipe.

In order to mount and connect the nozzle holders 56 to the feed pipes 54, each nozzle holder is provided with a connector 56G disposed on the inner end portion of the nozzle holder. As seen in the drawings, particularly FIGS. 10 and 15, the connector 56G assumes a generally C-shape which is configured to wrap around a portion of the feed pipe 54. Note that connector 56G includes a pair of screw openings 56H. The screw openings can be threaded or non-threaded. When a pair of nozzle holders 56 are connected to the feed pipe 54, as illustrated in FIG. 6, it follows that one connector 56G associated with one nozzle holder will include threaded openings while the other connector associated with the other nozzle holder will simply include a screw sleeve for receiving a pair of screws 60. Screws 60 are extended through one connector 56G into the threaded screw openings of the other connector and the screws are tightened to pull both connectors into a tight fit around the feed pipe 54. Note that the nozzle holders 56 include a portion that projects through the connector 56G. This is referred to as a stub end 56I. See FIGS. 6, 10 and 15. Stub end 56I of the nozzle holder 56 is designed to be inserted into opening 54B formed in the wall 54A of the feed pipe 54. An O-ring 62 is interposed between the wall 54A of the feed pipe 54 and the stub end 56I in order to form a liquid tight seal between the feed pipe 54 and the nozzle holder 56. Note in FIG. 6 that each connector 56G includes an O-ring recess formed in the stub end of 56I for receiving the O-ring 62. As shown in FIG. 6, the O-ring 62 forms a liquid tight seal between the feed pipe 54 and the connector 56G.

Figure 9:
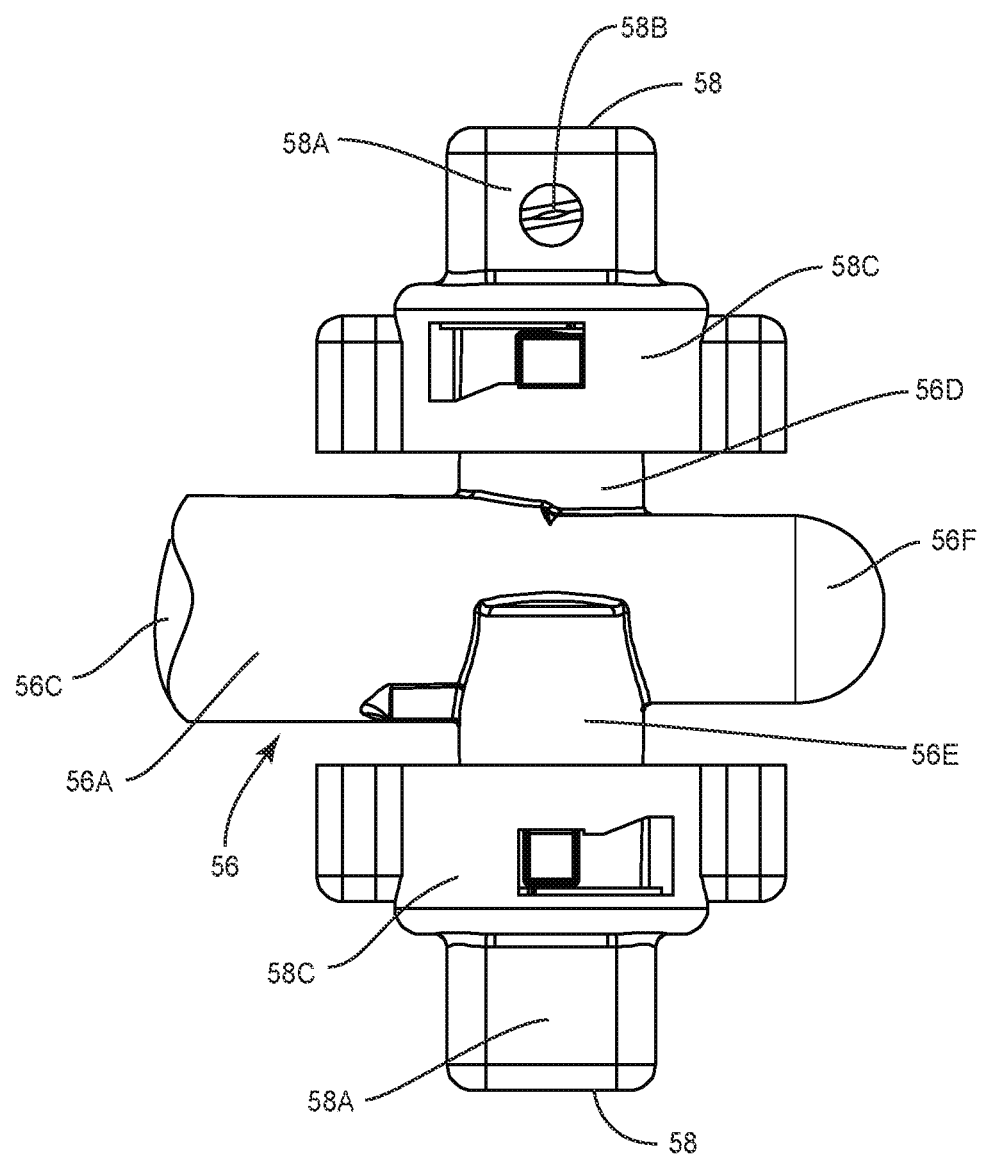
FIG. 9 is a fragmentary side elevational view showing a portion of a nozzle holder supporting a pair of nozzles.
Figure 11:
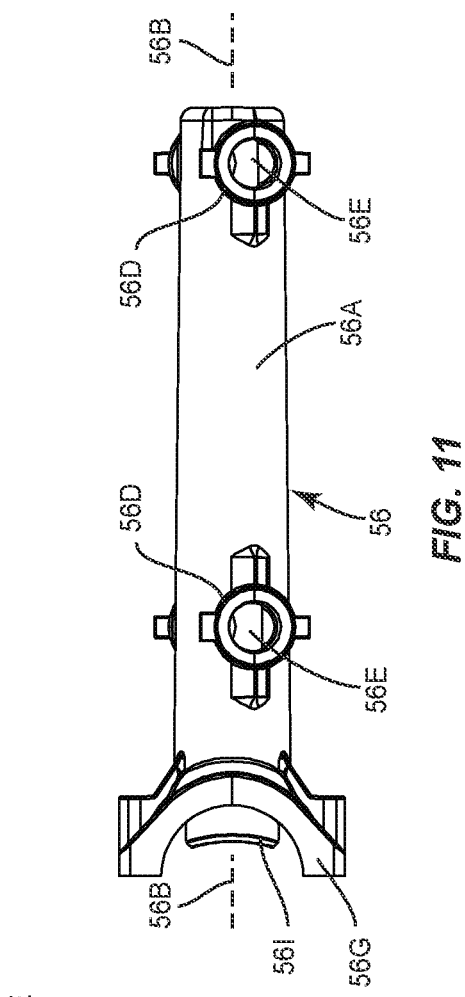
FIG. 11 is a top plan view of the nozzle holder shown in FIG. 10.
Figure 10:
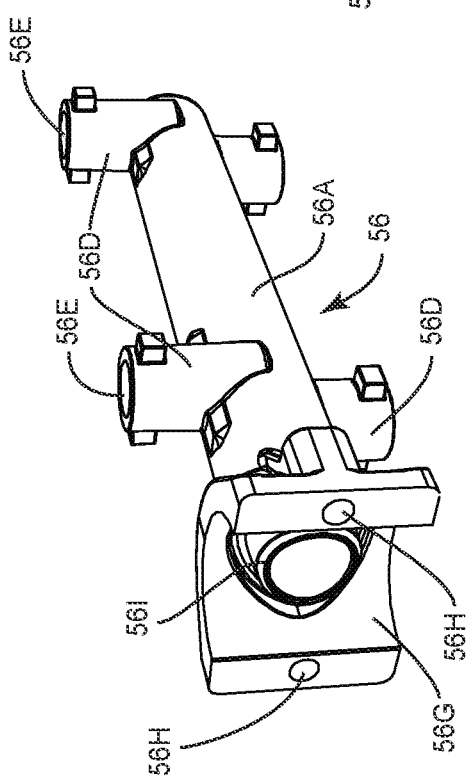
FIG. 10 is a perspective view of one embodiment of the nozzle holder.
Figure 14:
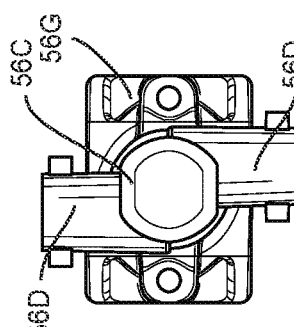
FIG. 14 is an end elevational view showing the outer end of the nozzle holder of FIG. 12.
Figure 13:
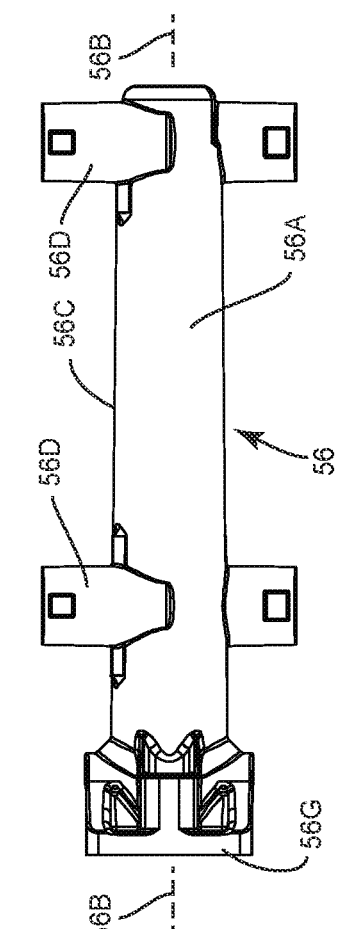
FIG. 13 is a side elevational view showing the inner end of the nozzle holder of FIG. 12.
Figure 12:
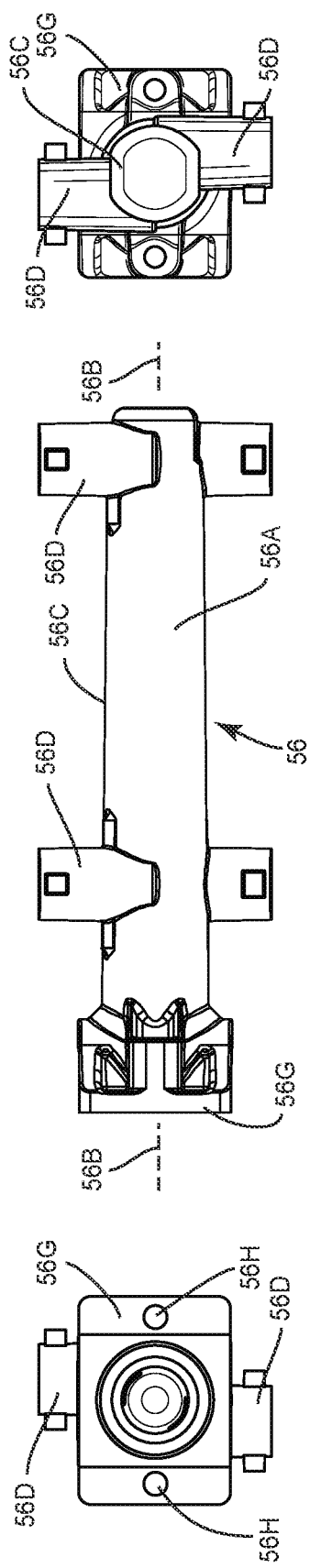
FIG. 12 is a side elevational view of the nozzle holder shown in FIG. 10 with portions of a connector shown in sections.

A series of nozzles 58 are detachably secured to the outer terminal ends of the branch conduits 56D. As shown in FIG. 9, nozzle 58 includes a main body 58A, an orifice 58B, and a connecting portion 58C. Various means can be employed for detachably securing the nozzles 58 to the branch conduits 56D. It is preferred that the nozzle design be such that the nozzles can be quickly and easily attached and detached from the branch conduits 56D. In one embodiment, the nozzles 58 are attached to the terminal ends of the branch conduits 56D via a twist and lock bayonet connection. In order to provide a liquid tight seal between the branch conduits 56D and the nozzles 58, there is provided a gasket 59 that is interposed between the nozzles 58 and the terminal ends of the branch conduits 56D. See FIG. 4.

Nozzles 58 and branch conduits 56D can be spaced and oriented in various ways. In the exemplary embodiments shown in the drawings, pairs of branch conduits 56D are grouped. Each pair of branch conduits 56D is offset with respect to the longitudinal axis 56B of the main conduit 56A. In addition, the branch conduits 56D of each pair project in opposite directions from the outer wall 56C. See FIGS. 12 and 14, for example. In this exemplary embodiment, nozzles 58 are aimed such that the backwash spray from each nozzle passes over or under a portion of the nozzle holder 56. This arrangement enables the spacing between the nozzles 58 and the targeted filter media 20 to be increased for a particular spacing that exists between successive filter discs 16. Hence, for a given nozzle design, this tends to increase the effective spray pattern of the nozzle.

Figure 4:
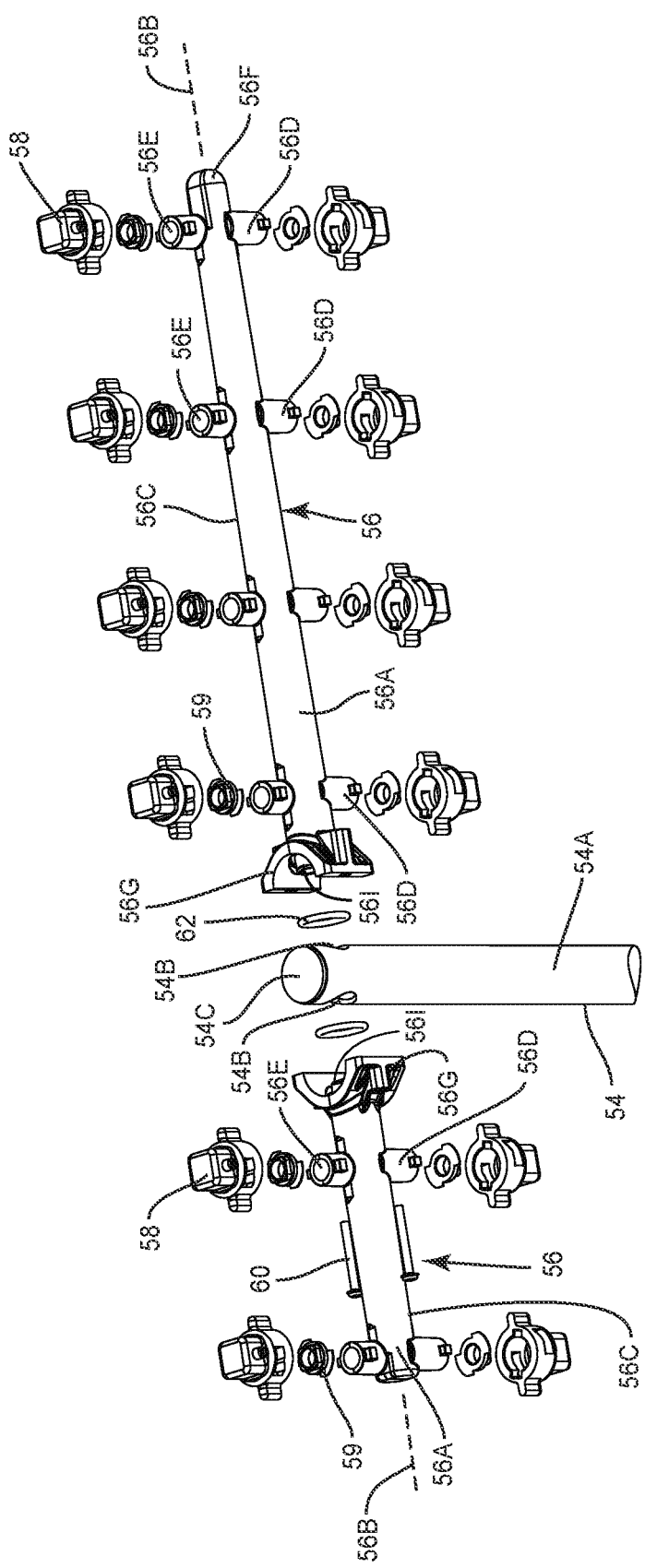
FIG. 4 is a perspective exploded view showing a pair of nozzle holders and a portion of a backwash feed pipe.
Figure 5:
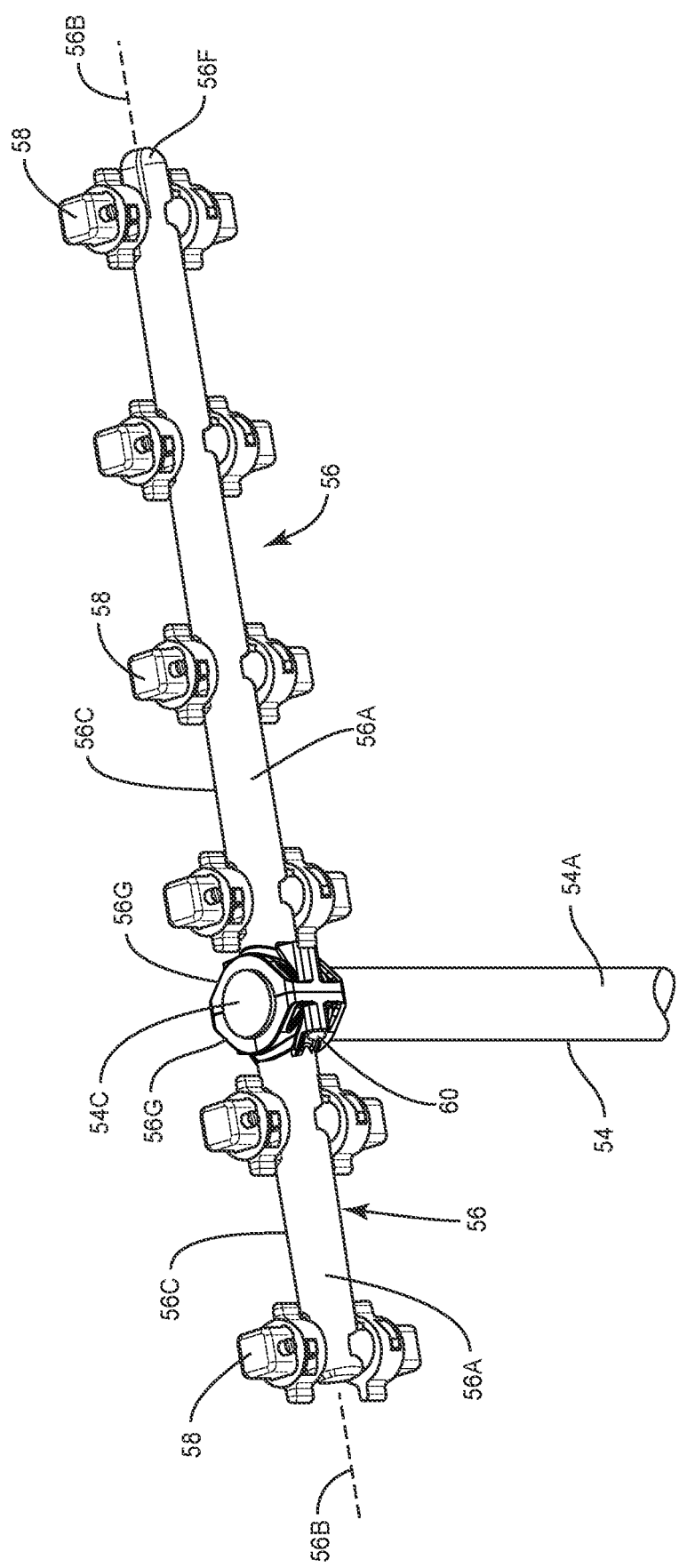
FIG. 5 is a perspective view similar to FIG. 4 but showing the nozzle holders connected to the feed pipe.

FIGS. 4-6 illustrate how the nozzle holders 56 are secured to the feed pipe 54. In this embodiment, two nozzle holders 56 are cantilevered from the feed pipe 54. At the same time, the nozzle holders 56 form a liquid tight seal with the feed pipe 54. Each C-shaped connector 56G wraps around a portion of the feed pipe 54. As shown in FIG. 6, screws 60 secure the two connectors 56G together. When tightened, the connectors 56G pull the stub end 56I of each nozzle holder into an opening 54B formed in the feed pipe. With the presence of the O-ring 62 interposed between the feed pipe and the connector 56G of the nozzle holder, a liquid tight seal is provided. Thus, it is appreciated that backwash pumped into the feed pipe 54 is directed into each of the nozzle holders 56 and through the nozzles 58 mounted on the branch conduits 56D. It should be appreciated that a single nozzle holder 56 can be secured in similar manner to the feed pipe. In this case, one might use a complimentary C-shaped connector, not associated with another nozzle holder, in order to connect to a connector 56G that is associated with the nozzle holder that is to be connected to the feed pipe.

As indicated above, in some embodiments the connector 56G functions to connect the nozzle holder 56 to the feed pipe 54. In other embodiments, the connector 56G functions to connect one nozzle holder to another nozzle holder. For example, in one embodiment two nozzle holders can be connected in end-to-end relationship by two cooperating connectors.

In one exemplary embodiment, the nozzle holder 56 is constructed of molded plastic. In this exemplary embodiment, this means that the main conduit 56A, branch conduits 56D and the connector 56G comprise a single piece of molded plastic. In other embodiments, the nozzle holder 56 includes two or more of its functional components permanently secured together. In this embodiment, for example, the branch conduits 56D are permanently secured to the main conduit 56A. In another example, both the branch conduits 56D and the connector 56G are permanently secured to the main conduit 56A. When plastic is employed for the nozzle holder 56 or portions thereof, permanent connections can be made ultrasonically (for example, by ultrasonic welding) or heat welding and sealing (for example, heat or hot plate welding). The term "permanently secured" excludes connections by mechanical fasteners, such as screws, bolts and rivets. The specification and claims used the term "operatively connected". "Operatively connected" means that two structures can be directly or indirectly connected. For example, there is a reference to a plurality of nozzle holders operatively connected to the feed pipes for receiving backwash therefrom. Here the plurality of nozzle holders might not be directly connected to the feed pipes, but they may be indirectly connected because backwash flows from the feed pipes into the plurality of nozzle holders.

There are many advantages to the backwashing system, particularly to the nozzle holder 56 and the manner in which the nozzle holder is communicatively connected to the feed pipe 54. First, the nozzle supporting structure secured to the end of the feed pipes 54 is of a lightweight construction. This significantly reduces the load on the feed pipes 54 and reduces the torque required to rotate the manifold 52 during cleaning operations. Further, the design of the nozzle holder 56 minimizes the components used to support the nozzles 58. The design of the feed pipe 54 and nozzle holder 56 reduces the number of welded and screw joints and this in turn reduces the potential for joint leakage. In the end, the design and arrangement of the feed pipes and nozzle holder reduces costs, and reduces assembly and delivery times. Further, the feed pipe and nozzle holder design is less bulky and enables the filter discs 16 to be stacked closer together around the drum 14. By enabling more filter discs 16 per unit length of drum, this increases filter capacity for a given footprint and in the end, tends to reduce the overall cost of a disc filter in relationship to filtering capacity.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A rotary disc filter for filtering water and removing suspended solids from the water comprising:
   a rotary drum for receiving water and having a plurality of openings for permitting the water to flow from the drum;
   a drive for rotatively driving the rotary drum;
   a series of disc-shaped filter members secured around the drum for receiving water from the drum;
   filter media disposed on opposite sides of the disc-shaped filter members for filtering the water as the water flows from the disc-shaped filter members outwardly through the filter media to yield filtered water;
   a backwash system for backwashing the filter media including:
     a series of backwash feed pipes configured to receive a backwash;
     a plurality of nozzle holders operatively connected to the feed pipes for receiving backwash therefrom;
     each nozzle holder including:
       an elongated main conduit having an outer wall and configured to receive the backwash from a respective feed pipe;
       a plurality of branch conduits projecting outwardly from the outer wall of the main conduit;
       each branch conduit including an outer end portion and a through opening configured to channel backwash from the main conduit through the branch conduit; and
     a nozzle secured to the outer end portions of the branch conduits.

2. The rotary disc filter of claim 1 wherein the main conduit includes a longitudinal axis and wherein at least two branch conduits projecting from the main conduit project in opposite directions.

3. The rotary disc filter of claim 1 wherein the main conduit includes a longitudinal axis and wherein at least two of the branch conduits projecting therefrom are offset with respect to the longitudinal axis.

4. The rotary disc filter of claim 1 wherein the main conduit includes a longitudinal axis and wherein at least two branch conduits project from the main conduit in opposite directions and are offset with respect to the longitudinal axis of the main conduit.

5. The rotary disc filter of claim 1 wherein the feed pipe includes a wall, a terminal end portion and at least one opening formed in the wall about the terminal end portion; and wherein a pair of said nozzle holders are secured to the terminal end portion of the feed pipe and communicatively open to the at least one opening in the wall of the feed pipe for permitting backwash to flow from the feed pipe into the main conduits of the nozzle holders.

6. The rotary disc filter of claim 1 wherein the feed pipe includes a terminal end portion having at least one opening; and wherein the nozzle holder includes first and second end portions and a connector formed on the first end portion and integral with the nozzle holder, the connector configured to engage the terminal end portion of the feed pipe and secure the nozzle holder to the feed pipe such that backwash flows from the feed pipe, through the at least one opening in the terminal end portion thereof and into the main conduit of the nozzle holder.

7. The rotary disc filter of claim 6 wherein a portion of the first end portion of the nozzle holder projects through the connector.

8. The rotary disc filter of claim 7 wherein the portion of the first end portion of the nozzle holder that projects through the connector also projects into an opening formed in a wall of the feed pipe.

9. The rotary disc filter of claim 1:
   wherein the nozzle holder includes first and second end portions;

a connector disposed on the first end portion of the nozzle holder and configured to secure the nozzle holder to the feed pipe; and a portion of the first end portion of the nozzle holder projecting through the connector and inserted into an opening formed in a wall of the feed pipe.

10. The rotary disc filter of claim 1 wherein a pair of nozzle holders are connected to a terminal end portion of the feed pipe in longitudinal alignment; and wherein each of the pair of nozzle holders include an integral connector disposed about one end portion thereof and which extends around a portion of the feed tube; and one or more fasteners for engaging the connectors and securing the connectors together such that the feed pipe is generally sandwiched between the two connectors and the nozzle holders.

11. The rotary disc filter of claim 1 wherein:

the nozzle holder includes a connector configured to connect the nozzle holder to the feed pipe such that backwash can flow from the feed pipe into the nozzle holder; and wherein the main conduit, outer wall, branch conduits and connector comprise a single piece of molded plastic.

12. The rotary disc filter of claim 11 wherein a portion of the main conduit projects through the connector.

13. The rotary disc filter of claim 12 wherein the portion of the main conduit projecting through the connector interfaces with an opening formed in the feed pipe and wherein the connector engages the feed pipe and secures the nozzle holder to the feed pipe such that backwash flows from the feed pipe into the nozzle holder.

14. The rotary disc filter of claim 1 wherein the main conduit includes an outboard end that includes a generally round or spherical tip that generally prevents the nozzle holder from being damaged if the nozzle holder inadvertently engages the drum while the drum is rotating.

15. A rotary disc filter for filtering water and removing suspended solids from the water comprising:

a rotary drum for receiving water and having a plurality of openings for permitting the water to flow from the drum;

a drive for rotatively driving the rotary drum;

a series of disc-shaped filter members secured around the drum for receiving water from the drum;

filter media disposed on opposite sides of the disc-shaped filter member for filtering the water as the water flows from the disc-shaped filter members outwardly through the filter media to yield filtered water;

a backwash system for backwashing the filter media, the backwash system including:

at least one backwash feed pipe configured to receive a backwash;

a first nozzle holder operatively connected to the backwash feed pipe for receiving backwash therefrom;

the nozzle holder including an elongated main conduit and a series of spaced apart branch conduits projecting outwardly from the main conduit;

wherein at least two of the branch conduits project generally in opposite directions from the main conduit of the nozzle holder;

the branch conduits including terminal end portions and a throughway configured to channel backwash from the main conduit through the throughway and out the branch conduits;

nozzles disposed on the terminal end portions of the branch conduits; and a connector disposed on the nozzle holder and configured to connect the nozzle holder to the feed pipe or to another nozzle holder.

16. The rotary disc filter of claim 15 further including a second nozzle holder; and wherein the connector is integral with each nozzle holder and wherein the integral connector is configured to connect the first and second nozzle holders to the feed pipe such that the first and second nozzle holders are aligned and extend outwardly from the feed pipe.

17. The rotary disc filter of claim 15 wherein the connector forms an integral part of the first nozzle holder and is configured to assist in securing the first nozzle holder to the feed pipe; and wherein the connector is disposed on a first end portion of the main conduit; and wherein the main conduit projects through the connector and into an opening formed in a wall of the feed pipe.

18. The rotary disc filter of claim 15 wherein the main conduit includes a longitudinal axis and wherein the branch conduits are longitudinally and circumferentially spaced and offset with respect to a longitudinal axis of the main conduit.

* * * * *